(12) United States Patent
Feng et al.

(10) Patent No.: US 10,959,419 B2
(45) Date of Patent: Mar. 30, 2021

(54) **METHOD FOR CONTROLLING *AURELIA* SPP. BLOOMS IN HARBORS**

(71) Applicant: Institute of Oceanology, Chinese Academy of Sciences, Shandong (CN)

(72) Inventors: Song Feng, Shandong (CN); Fang Zhang, Shandong (CN); Jianing Lin, Shandong (CN); Minxiao Wang, Shandong (CN); Shiwei Wang, Shandong (CN); Song Sun, Shandong (CN)

(73) Assignee: Institute of Oceanology, Chinese Academy of Sciences, Qingdao (CN)

( * ) Notice: Subject to any disclaimer, the term of this patent is extended or adjusted under 35 U.S.C. 154(b) by 163 days.

(21) Appl. No.: 16/260,060

(22) Filed: Jan. 28, 2019

(65) Prior Publication Data
US 2019/0313631 A1  Oct. 17, 2019

(30) Foreign Application Priority Data

Apr. 13, 2018  (CN) .......................... 201810329953.0

(51) Int. Cl.
| | | |
|---|---|---|
| *A01M 29/30* | (2011.01) | |
| *C02F 1/68* | (2006.01) | |
| *C09D 5/16* | (2006.01) | |
| *C09D 115/02* | (2006.01) | |
| *C09D 193/04* | (2006.01) | |
| *C02F 103/00* | (2006.01) | |

(52) U.S. Cl.
CPC ............... *A01M 29/30* (2013.01); *C02F 1/68* (2013.01); *C09D 5/16* (2013.01); *C09D 115/02* (2013.01); *C09D 193/04* (2013.01); *C02F 2103/007* (2013.01); *C02F 2303/20* (2013.01)

(58) Field of Classification Search
CPC ......... A01M 29/30; A01K 73/02; B63B 35/16
See application file for complete search history.

(56) References Cited

PUBLICATIONS

Long-term change in the abundance of northern Gulf of Mexico scyphomedusae Chrysaora sp. and Aurelia spp. with links to climate variability, Kelly L. Robinson and William M. Graham https://aslopubs.onlinelibrary.wiley.com/doi/abs/10.4319/lo.2013.58.1.0235 (Year: 2013).*

* cited by examiner

*Primary Examiner* — Magdalena Topolski
*Assistant Examiner* — Arfan Y. Sinaki

(57) ABSTRACT

A method for controlling *Aurelia* spp. blooms in harbors includes: designing different sites at equal intervals in an area in spring, collecting *ephyrae* of *Aurelia* spp. with an I-type trawl net for zooplankton from bottom to surface, determining whether polyps of *Aurelia* spp. inhabit in the vicinity of the sites; seeking large floating substrates that the polyps attach to using scuba diving in the determined habitats of the polyps; dragging the substrates to a shore base and scraping off all organisms attached to bottom surfaces of the substrates in a physical manner, then air drying the substrates for 7 days or more; and applying an antifouling paint on the bottom surfaces of the dried substrates followed by drying, then returning the substrates back to their original sites in the sea to control the bloom of *Aurelia* spp. in the area.

5 Claims, 6 Drawing Sheets

METHOD FOR CONTROLLING *AURELIA* SPP. BLOOMS IN HARBORS

CROSS-REFERENCE TO RELATED APPLICATIONS

This application claims the benefit of priority from Chinese Patent Application No. CN 201810329953.0, filed on Apr. 13, 2018. The content of the aforementioned application, including any intervening amendments thereto, is incorporated herein by reference in its entirety.

TECHNICAL FIELD

The present invention relates to research and development of controlling the occurrence of marine ecological disasters, and particularly to a method for effectively controlling *Aurelia* spp. *ephyrae* blooms in harbors.

BACKGROUND ART

*Aurelia* spp. *ephyrae*, nicknamed "moon jellyfish", is a widely distributed species of *Aurelia*, Ulmaridae, Semaeostomeae, Scyphozoa, Cnidaria, usually 10-30 cm in diameter for adults. In recent decades, *Aurelia* spp. *ephyrae* frequently blooms in many coastal harbors and bays around the globe, including Japan, Korea, America and so on, which has posed severe damages to some coastal infrastructures and caused threats to human social security and normal life. For example, high-density aggregations of *Aurelia coerulea* near a power plant (Qingdao, China) caused the power failure in local areas due to clogging of cooling water intakes in July 2009. Blooms of *A. coerulea* near Hongyanhe nuclear power plant (China) resulted in the unit shutdowns for a week, thus bringing direct financial loss of up to hundreds of millions of yuan in July 2014. Besides, *Aurelia* spp. *ephyrae* competes with fish for the same baits, and even may prey on a lot of fish eggs and larvae, thus mass occurrence of *Aurelia* spp. *ephyrae* would threaten the neritic fishery resource, reduce the recruitments of fishery resources, and cause the exhaustion of fish stock. Therefore, in order to protect the health of marine ecosystem and development of economy near the shore, there is an urgent need to control the *Aurelia* spp. *ephyrae* blooms.

SUMMARY OF THE PRESENT INVENTION

In view of the above problems, the present invention provides a method for controlling an *Aurelia* spp. *ephyrae* bloom in a harbor.

The method for controlling an *Aurelia* spp. *ephyrae* bloom in a harbor comprises the following steps:

1) designing less than or equal to ten different sites at equal intervals in spring, collecting *Aurelia* spp. *ephyrae* with an I-type trawl net for zooplankton from the bottom of the harbor to the surface of the water, determining whether *Aurelia* spp. *ephyrae* polyps inhabit in the vicinity of each of the different sites;

2) seeking large floating substrates that the polyps attach to by using scuba diving in the determined habitats of the polyps;

3) dragging the substrates to a shore base and scraping off all organisms attached to bottom surfaces of the substrates in a physical manner, then air drying the substrates for more than 7 days; and 4) applying an antifouling paint on the bottom surfaces of the dried floating substrates followed by drying, then returning the substrates back to the different sites to control the *Aurelia* spp. *ephyrae* bloom in the harbor.

In step 1), less than or equal to ten different sites are designed at equal intervals in spring (from April to May). The *Aurelia* spp. *ephyrae* are collected with the I-type trawl net for zooplankton from the bottom of the harbor to the surface of the water to determine whether the *Aurelia* spp. *ephyrae* polyps inhabit in the vicinity of each of the different sites. If the *Aurelia* spp. *ephyrae* are found in a certain site, then the polyps habitat near the site; if no *Aurelia* spp. *ephyrae* are found in the different sites, a collecting area is further expanded till the *Aurelia* spp. *ephyrae* are found.

In step 2), the *Aurelia* spp. *ephyrae* polyps are sought by using the scuba diving in an area with reduced water flow near the site where the *Aurelia* spp. *ephyrae* are found; it is demonstrated that a large number of *Aurelia* spp. *ephyrae* polyps attach upside down to the bottom surfaces of the floating substrates.

In step 3), all organisms attached to the bottom surfaces of the floating substrates with polyps attached thereto are completely scraped off (it is considered as complete removal when no organism on the bottom surfaces is visible to the naked eye) in a physical manner, and then the scraped substrates are dried in the sun for more than 7 days.

In step 4), 2-3 layers of antifouling paint are applied on the bottom surfaces of the floating substrates, with a paint film of 50-75 μm in thickness. The paint may be a paint with an antifouling property, such as a modified chlorinated rubber antifouling paint.

Further, the method is described as follows.

(1) Seeking out *Aurelia* spp. *ephyrae*

Less than or equal to ten different sites are designed at equal intervals in spring (from April to May). The *Aurelia* spp. *ephyrae* (1) are collected with the I-type trawl net for zooplankton from the bottom of the harbor to the surface of the water to determine whether the *Aurelia* spp. *ephyrae* polyps inhabit in the vicinity of each of the different sites. If the *Aurelia* spp. *ephyrae* (1) are found in a certain site, then the polyps habitat near the site; if no *ephyrae* are found in the different sites, the collecting area is further expanded till the *Aurelia* spp. *ephyrae* are found.

(2) Seeking Out *Aurelia* Spp. *Ephyrae* Polyps by Using Scuba Diving

The *Aurelia* spp. *ephyrae* polyps (2) are sought by using the scuba diving in an area with reduced water flow near the site where *Aurelia* spp. *ephyrae* (1) are found. It is demonstrated that a large number of *Aurelia* spp. *ephyrae* polyps attach upside down to the bottom surfaces (3) of the floating substrates. Not all of these substrates are attached with *Aurelia* spp. *ephyrae* polyps, and therefore an on-site search by using scuba diving is required for screening of the substrates.

(3) Removing Polyps on the Bottom Surfaces of the Substrates

The floating substrates to which *Aurelia* spp. *ephyrae* polyps attach are dragged to a shore-based plant (e.g., a dockyard), and *Aurelia* spp. *ephyrae* polyps and all of other sessile organisms attaching to the bottom surfaces of the substrates are completely scraped off in a physical manner.

(4) Applying Antifouling Paint on the Bottom Surfaces of the Substrates

The substrates are dried in the sun for more than 7 days after the *Aurelia* spp. *ephyrae* polyps and other sessile organisms on the bottom surfaces of the substrates are completely scraped off. Two to three layers of the modified chlorinated rubber antifouling paint (which is prepared by grinding and mixing chlorinated rubber, plasticizer, cuprous oxide, pigment, adjuvant, etc.) are applied on the bottom surfaces of the substrates, with a paint film of 50-75 μm in thickness. Afterwards, the substrates were dried in the sun for one month. The substrates are returned back to the different sites in the sea.

The present invention provides the following benefits.

*Aurelia* spp. *ephyrae* polyps can be significantly removed, and the reattachment of *Aurelia* spp. *ephyrae* planulae on the substrates can be inhibited. Therefore, the *Aurelia* spp. *ephyrae* blooms are effectively controlled. The present invention is suitable for prevention and control of *Aurelia* spp. *ephyrae* blooms in harbors, providing a new technique for controlling the *Aurelia* spp. *ephyrae* blooms.

In the past, the *Aurelia* spp. *ephyrae* blooms were controlled by fishing, pumping and blocking with related devices. These emergency measures cost too much, and have to be carried out repeatedly every year because they are incapable of resolving the *Aurelia* spp. *ephyrae* blooms entirely. Based on the life history of *Aurelia* spp. *ephyrae* in basal biology and ecological principle, attachment characteristics of *Aurelia* spp. *ephyrae* polyps in the natural waters, as the engine of *Aurelia* spp. *ephyrae* blooms, are explored by using scuba diving; therefore, the present invention solves the problem from the benthic stage, *Aurelia* spp. *ephyrae* polyps.

The antifouling paint is applied to the bottom surfaces of substrates after the *Aurelia* spp. *ephyrae* polyps are removed. In this way, reattachment of planulae on the substrates can be inhibited. Though regular maintenance, for example, applying antifouling paint every 4 years to clear away the *Aurelia* spp. *ephyrae* polyps, *Aurelia* spp. *ephyrae* blooms can be effectively prevented and controlled for a long time.

DETAILED DESCRIPTION OF THE PRESENT INVENTION

The present invention is further described below with reference to the drawings and embodiments. The present invention is suitable for prevention and control of *Aurelia* spp. *ephyrae* blooms in an enclosed or semi-enclosed harbor or bay, and particularly for control of aggregations of *Aurelia* spp. *ephyrae* near the cooling water intakes of power plants and nuclear power plants, etc., which can significantly reduce the abundance of *Aurelia* spp. *ephyrae* in nearby waters, ensuring ecological health in the harbor and safety of cooling water source of coastal infrastructures. The present invention puts forward a new technique for the control of the *Aurelia* spp. *ephyrae* blooms in harbors.

EXAMPLE

Taking the control of *A. coerulea* blooms in Middle Harbor, Port of Qingdao as an example, this embodiment is described in detail.

(1) Seeking Out *A. coerulea* Ephyrae in the Harbor

Figure 1:
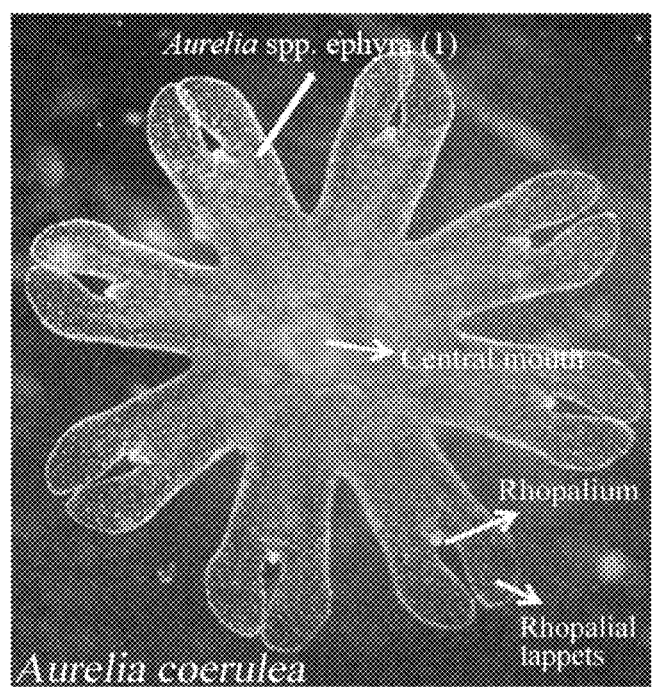
FIG. 1 shows an image of an *Aurelia coerulea* ephyra.

Massive *A. coerulea* appeared in the Middle Harbor, Port of Qingdao before 2014. In May 2014, five sites were designed, and *Aurelia* spp. *ephyrae* were collected with an I-type trawl net for zooplankton from the bottom of the harbor to the surface of the water. Massive *A. coerulea* ephyrae were collected in each site (3-10 ind/net, see FIG. 1). Thus, it was determined that a large number of *A. coerulea* polyps lived in this area. *A. coerulea* ephyra is mostly dark red or brown, with a cross-shaped central mouth, 8 pairs of rhopalial lappets and 8 rhopaliums. The rhopalial lappets are long and sharp without branches. Two rhopalial lappets get together at top. Nematocysts are dispersed on an umbrella surface in an irregular manner. The size of *ephyrae* is usually 2-3 mm.

(2) Seeking Out *A. coerulea* Polyps by Using Scuba Diving

Figure 2:
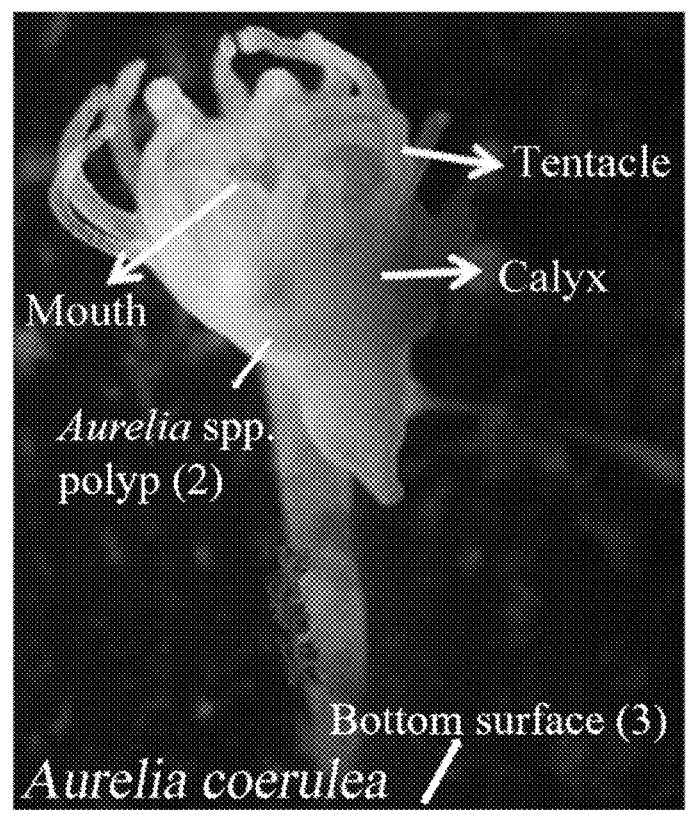
FIG. 2 shows an image of an *Aurelia coerulea* polyp.
Figure 3:
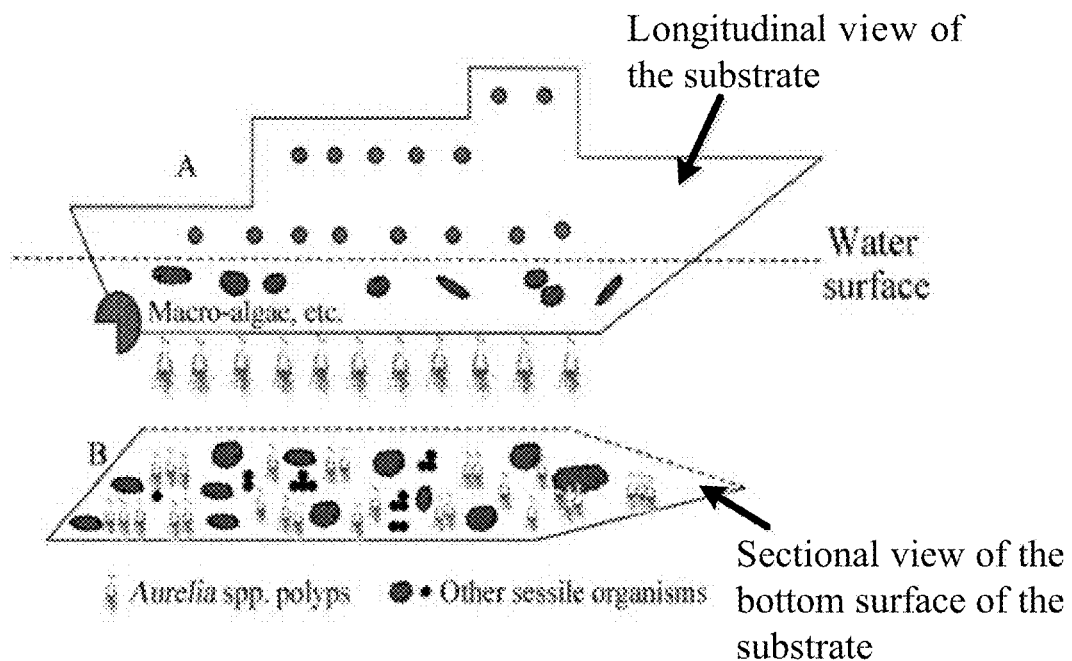
FIG. 3 shows the attachment of *Aurelia* spp. *ephyrae* polyps on the bottom surfaces of floating substrates; where A is a longitudinal diagram of the substrates, and B is a sectional view of the bottom surfaces of the substrates.
Figure 4:
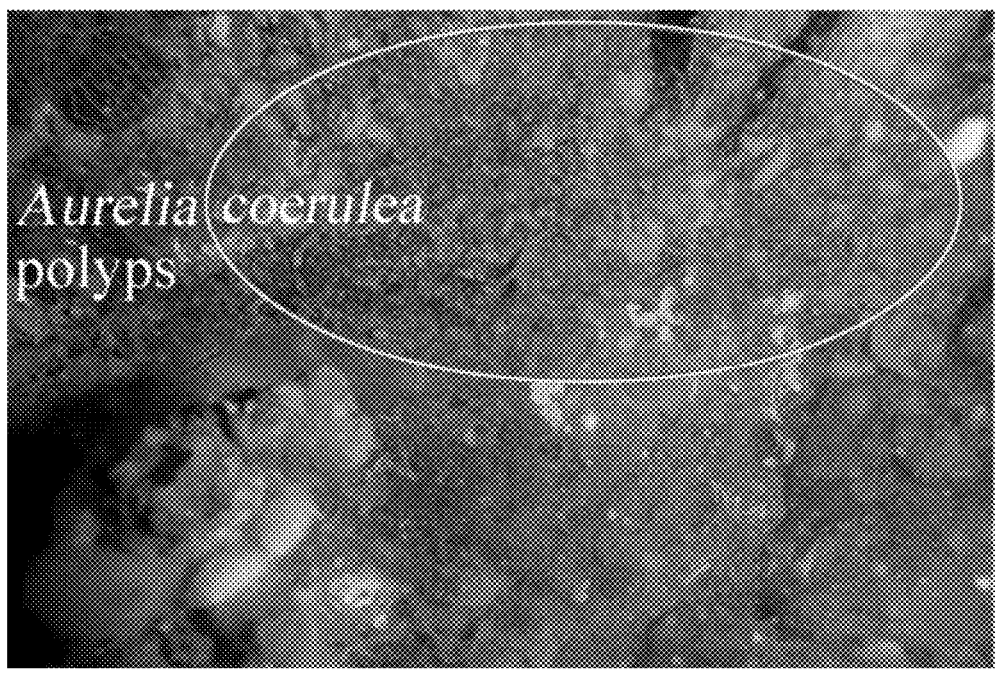
FIG. 4 shows the *Aurelia coerulea* polyps attaching to the bottom surfaces of floating docks 1, 2, and 3.
Figure 5:
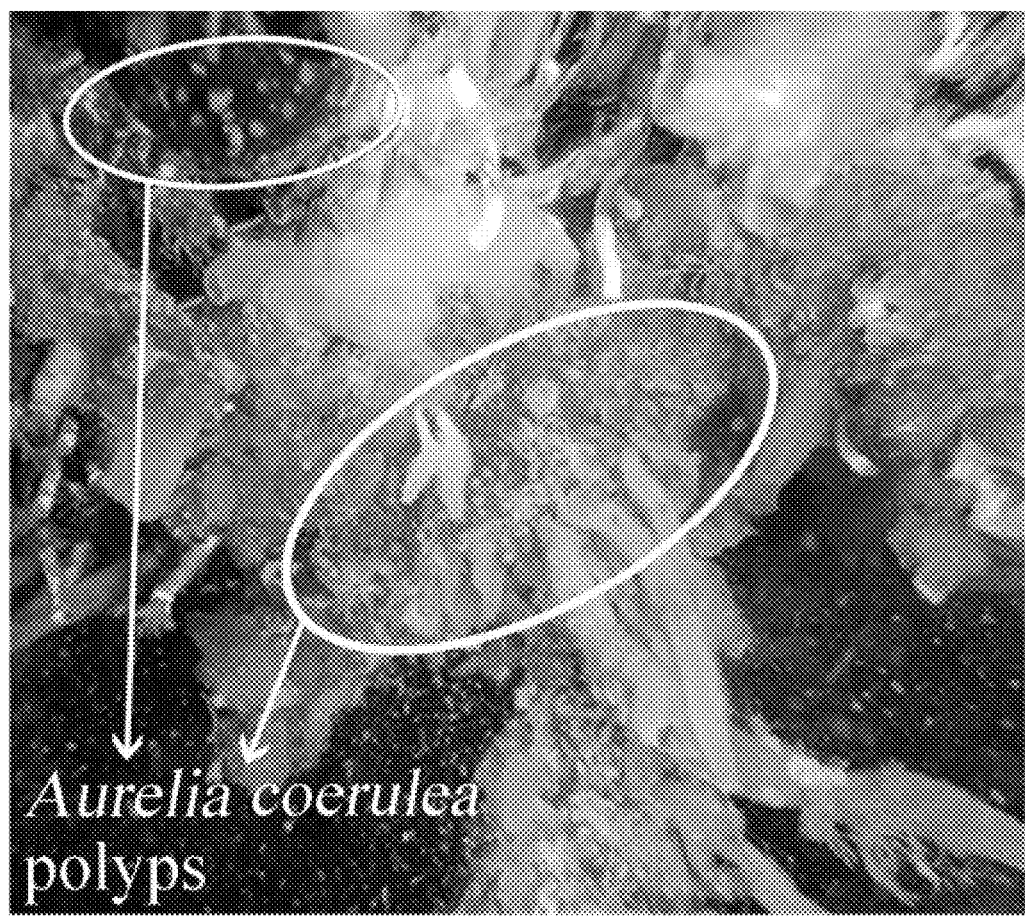
FIG. 5 shows the *Aurelia coerulea* polyps attaching to sessile organisms on the bottom of the floating docks 1, 2, and 3.

In June 2014, *A. coerulea* polyps were sought in this area by scuba diving and massive *A. coerulea* polyps attaching to three floating docks 1, 2, and 3 were found with a density of $2339.42 \pm 617.73$ ind·m$^{-2}$. Each floating dock was approximately 30 meters in length and 8 meters in width. The *A. coerulea* polyp (see FIG. 2) in an obconical shape is milky white with a relatively short stalk and 16 tentacles. On the surfaces of tentacles, nematocyst cluster is distributed with obvious protruding cilia. The diameter of polyp calyx is approximately 700~1100 μm. *A. coerulea* polyps settled upside down on the bottom surfaces (located 1.8 m below seawater surface) of the floating docks 1, 2, and 3, and distributed in patches (see FIG. 4). Lots of *A. coerulea* polyps also attached to the surfaces of some sessile organisms, such as ascidians and mussels that settled on the bottom surfaces of the floating docks (see FIG. 5).

(3) Removing *A. coerulea* Polyps on the Bottom Surfaces of the Substrates

In April, 2015 and 2016, the floating docks 1 and 2 were transported to Hongdao Shipyard, Jiaozhou Bay to completely scrape off *A. coerulea* polyps and other sessile organisms attaching to the bottom surfaces of the substrates. The floating dock 3 without treatment is provided as a control.

(4) Applying an Antifouling Paint on the Bottom Surface of the Substrate

The bottom surface of the floating dock 1 was dried in the sun for more than 7 days after the *A. coerulea* polyps and other sessile organisms were completely scraped off. Two layers of the modified chlorinated rubber antifouling paint, which was prepared by grinding and mixing chlorinated rubber, plasticizer, cuprous oxide, pigment, adjuvant, etc. (available from Yantai Federal Chemical Co., Ltd.), were applied on the bottom surfaces of the floating dock 1, with a paint film of 50-75 μm in thickness. The bottom surface of the floating dock 2 was dried after the *A. coerulea* polyps were scraped off, but not painted with the antifouling paint, in order to demonstrate the inhibition of antifouling paint against the reattachment of *A. coerulea* planulae. Afterwards, the floating docks 1 and 2 were dried in the sun for one month and then returned back to the original sites in the sea.

(5) Result

Figure 6:
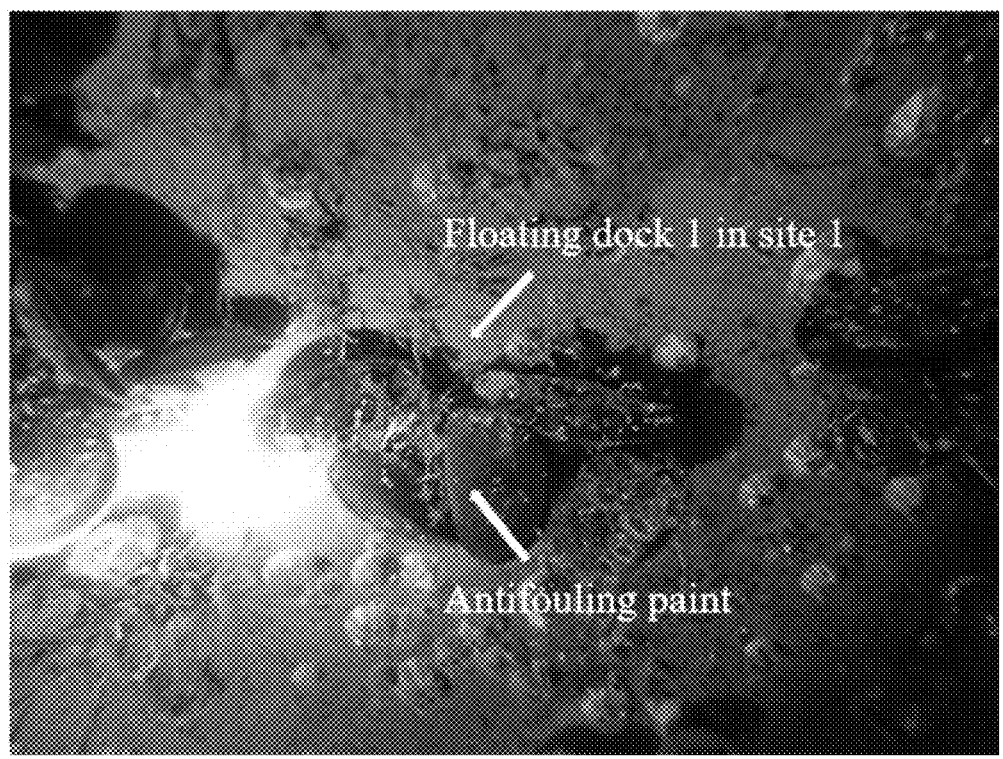
FIG. 6 shows the attachment of sessile organisms on the bottom surface of the floating dock 1 in Middle Harbor (Qingdao, China) two years after the bottom surface has been painted with the antifouling paint.
Figure 7:
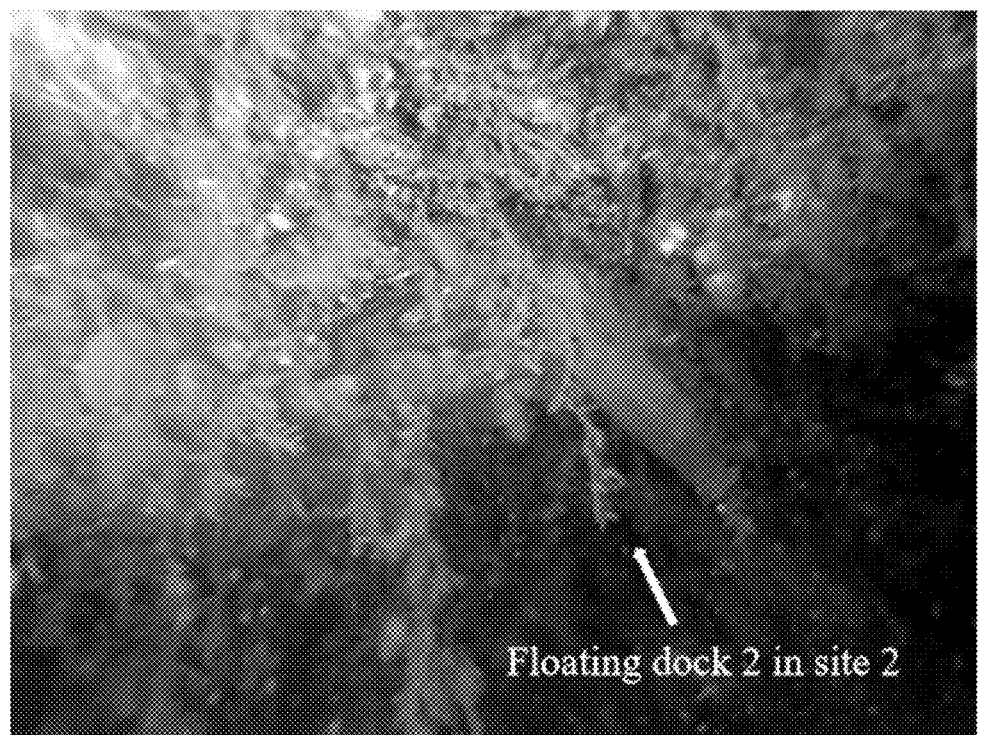
FIG. 7 shows the attachment of sessile organisms on the bottom surface of the floating dock 2 in Middle Harbor (Qingdao, China) one year after the bottom surface has not been painted with the antifouling paint.
Figure 8:
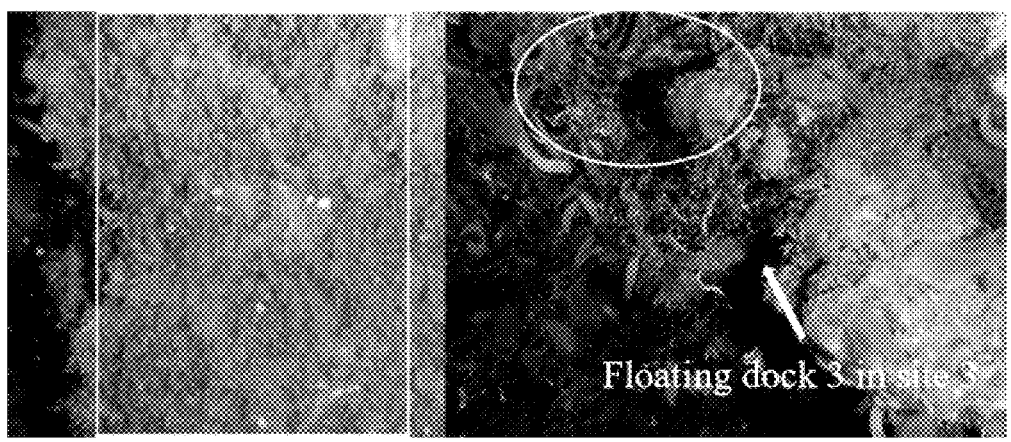
FIG. 8 shows the attachment of the *Aurelia coerulea* polyps on the bottom surface of the floating dock 3 without any treatment in June 2017.

It was demonstrated that the abundance of *A. coerulea* was decreased by 66~81% from 2015 to 2018 in comparison to 2014 using the method of the invention. Two years after the bottom surface of floating dock 1 was painted with the antifouling paint, only a small amount of sessile organisms (FIG. 6) attached to the bottom surface, and the reattachment of *A. coerulea* polyps were not found there. However, a large number of sessile organisms had settled on the bottom surface of the floating dock 2 without the antifouling paint one year later (FIG. 7). Lots of *A. coerulea* polyps appeared in the second year, the density of which was $3512.31\pm2229.78$ ind·$m^{-2}$ in September, and more than in 2014. For the floating dock 3, massive *A. coerulea* polyps still settled on the empty space (left view in FIG. 8) and sessile organisms of the bottom surface (right view in FIG. 8), and the density was approximately 1700 ind·$m^{-2}$ in June (see FIG. 8). The attachment of *A. coerulea* polyps and other sessile organisms can be effectively inhibited by painting the antifouling paint. The *A. coerulea* blooms in Middle Harbor (Qingdao) can be effectively prevented and controlled for a long time through regular maintenance once every four years.

What is claimed is:

1. A method for controlling an *Aurelia* spp. *ephyrae* bloom in a harbor, comprising:
   1) designing less than or equal to ten different sites at equal intervals in spring, collecting *Aurelia* spp. *ephyrae* in the sea, determining whether *Aurelia* spp. *ephyrae* polyps inhabit in a vicinity of each of the different sites;
   2) seeking large floating substrates that the polyps attach to by using scuba diving in the determined habitats of the polyps;
   3) scraping off all organisms attached to bottom surfaces of the substrates in a physical manner, then air drying the substrates for more than 7 days; and
   4) applying an antifouling paint to the bottom surfaces of the dried floating substrates followed by drying, then returning the substrates back to the different sites to control the bloom of *Aurelia* spp. *ephyrae* in the harbor.

2. The method of claim 1, wherein in step 1), less than or equal to ten different sites are designed at equal intervals in spring, the *Aurelia* spp. *ephyrae* are collected in the sea to determine whether the *Aurelia* spp. *ephyrae* polyps inhabit in the vicinity of each of the different sites; if *Aurelia* spp. *ephyrae* are found in a certain site, then the polyps habitat near the site; if no *Aurelia* spp. *ephyrae* are found in this certain site, a collecting area is further expanded till the *Aurelia* spp. *ephyrae* are found.

3. The method of claim 1, wherein in step 2), the *Aurelia* spp. *ephyrae* polyps are sought using scuba diving in an area with reduced water flow near the site where *Aurelia* spp. *ephyrae* are found.

4. The method of claim 1, wherein in step 3), all organisms attaching to the bottom surfaces of the floating substrates are completely scraped off in a physical manner, and then the scraped substrates are dried in the sun for more than 7 days.

5. The method of claim 1, wherein in step 4), 2-3 layers of the antifouling paint are applied to the bottom surfaces of the substrates, with a paint film of 50-75 μm in thickness.

* * * * *